United States Patent [19]
Groth et al.

[11] Patent Number: 4,742,644
[45] Date of Patent: May 10, 1988

[54] SHIPPING CONTAINER FOR PLANTS

[75] Inventors: Ernst T. Groth, Apollo Beach, Fla.; Lukas T. Kruesi, Wyhlan, Fed. Rep. of Germany

[73] Assignee: Fischer Geraniums U.S.A., Inc., Homestead, Fla.

[21] Appl. No.: 42,918

[22] Filed: Apr. 27, 1987

[51] Int. Cl.$^4$ .............................................. A01G 9/02
[52] U.S. Cl. ........................................... 47/84; 47/85
[58] Field of Search ................... 47/84, 66, 82, 85, 86; 220/4 C, 423; 206/423, 564, 561; 34/237, 238

[56] References Cited

U.S. PATENT DOCUMENTS

| | | |
|---|---|---|
| 1,670,498 | 5/1928 | Einson . |
| 3,284,949 | 11/1966 | Park . |
| 3,606,004 | 9/1971 | Fruehwirth . |
| 3,660,934 | 5/1972 | Pollack et al. . |
| 3,664,062 | 5/1972 | Danielson . |
| 3,889,416 | 6/1975 | Bergeron et al. . |
| 4,070,793 | 1/1978 | Dillon . |

Primary Examiner—Robert A. Hafer
Assistant Examiner—Bradley M. Lewis
Attorney, Agent, or Firm—Foley & Lardner, Schwartz, Jeffery, Schwaab, Mack, Blumenthal & Evans

[57] ABSTRACT

A shipping container for shipping rooted plantlets and specially designed for accommodating rooted plantlets having the roots and growing media of a particular shape. The container includes a supporting frame, one or more plant frames and a cover, all of which are formed with tongues and grooves to permit nesting of the members in superimposed position to provide a relatively sealed container. Each of the one or more plant frames includes support members extending longitudinally or transversely between the end or side walls of the frame, and a plurality of spaced upright members projecting upwardly from each support member. Adjacent upright members define therebetween an area or compartment in which the rooted plantlets or liners can be positioned, with the upright members defining lateral or side openings through which extend the stem and leaves of the rooted plantlets. The spacing of the support members from each other and from the laterally adjacent walls of the frame are such that the leaves of the plants can be accommodated without damage. By positioning the plantlets generally horizontal in the plant frame, a greatly increased number of plantlets can be accommodated with a minimum of vertical dimension. All of the container components are preferably formed of plastics material, and more preferably are molded so as to minimize production costs and permit the components to be reused.

11 Claims, 2 Drawing Sheets

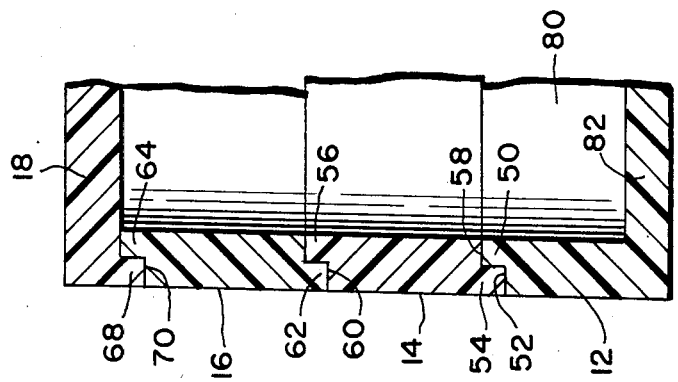
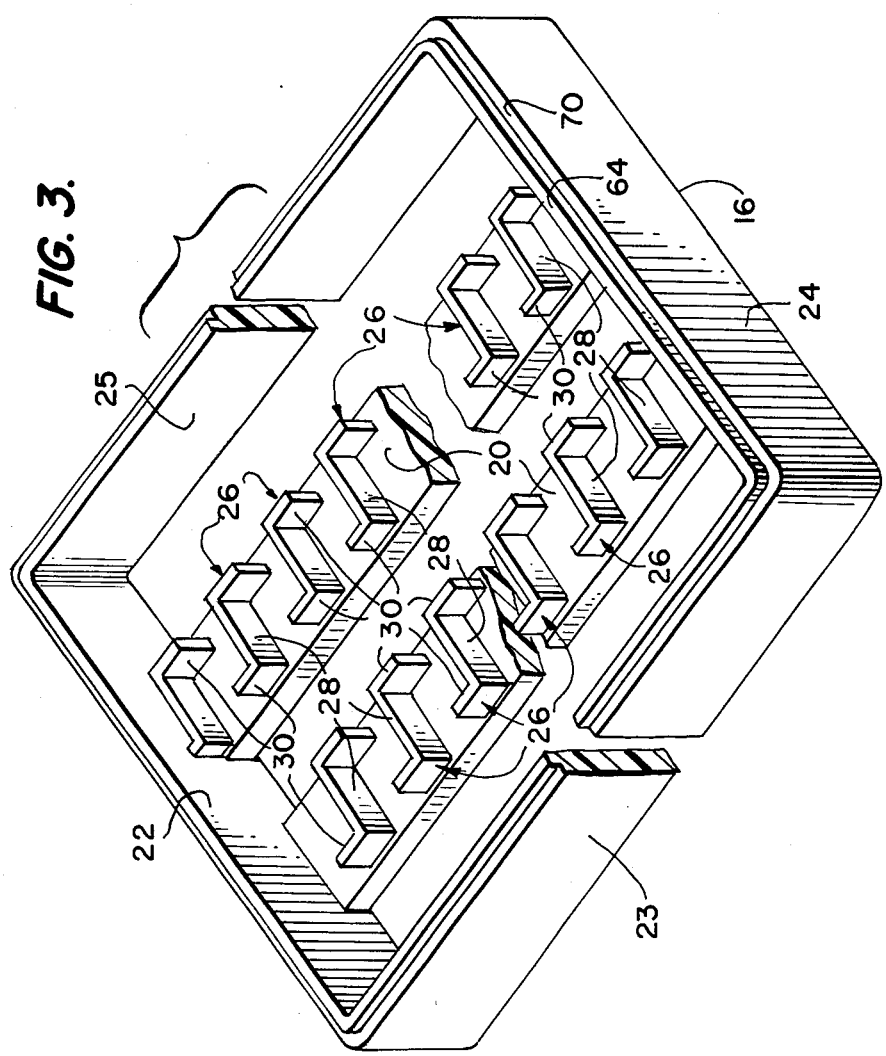

SHIPPING CONTAINER FOR PLANTS

BACKGROUND OF THE INVENTION

The present invention relates as indicated to a shipping container for plants, and relates more particularly to a container uniquely constructed of several components so as to maximize the number of plants shipped while firmly retaining the plant material during shipping. Open areas are provided between the layers of plants to permit the circulation of air, and the plantlets can be quickly and easily placed in or removed from the frames of the container.

The shipping of plant material is a problem which has continually confronted the horticultural industry. Even in conditions of moderate temperature, plants are frequently shipped relatively loosely in shipping containers as a result of which substantial damage to the plants is incurred during shipping. Many shipping containers are of little value in preventing the freezing of plants during shipping in extremely cold weather, and are similarly unable to prevent plant stress during shipping during periods of high heat and humidity under summer conditions.

The problems above referred to have been exacerbated recently by the shape of the small plant material shipped. The small plants, which are referred to by various terms such as rooted cuttings, liners, plantlets, or wedges are grown to a particular size, for example 2 to 3 inches, with the plant roots being retained in a growing media of a particular shape. In order to facilitate subsequent planting of the liners in larger containers, such as 4 inch pots, the roots and media are frequently wedge or conical shaped. Special containers having receptacle sections have had to be utilized for shipping the wedges or cones, and such. containers have been both relatively expensive to manufacture and limited in the amount of plant material capable of being shipped per unit area of container.

The prior art is replete with efforts to improve plant shipping containers in the several respects mentioned. U.S. Pat. No. 3,664,062 to Danielson illustrates a container for rooted plant cuttings in which tray units are provided which have slots or grooves which can be filled with growing media in which the rooted cuttings can be placed. The plants extend vertically, and the trays are thereafter superimposed one above the other when the shipping container is filled. Although the plants are able to grow during shipment in view of their being stacked in the growing media, the entire arrangement has certain other clear disadvantages.

U.S. Pat. No. 3,660,934 to Pollack et al discloses a tray having a plurality of containers, each of which is adapted to receive a cell pack, with the trays being inserted in covering sleeves a plurality of which can be vertically stacked in the shipping container.

U.S. Pat. No. 3,606,004 discloses a fiberboard shipping container in which individual pots can be slidably received in a tray which can thereafter be precisely positioned in the container. The plants extend vertically from the pots and only two layers of plants are provided for. U.S. Pat. No. 3,284,949 to Park similarly shows a shipping container in which trays are used to receive the media and rooted plants, with a cover being associated with each tray to enclose the growing media and permit the trays to be positioned so that the plants extend vertically upwardly or downwardly in the container. Again, the amount of plants able to be shipped per unit volume of shipping container is very limited.

SUMMARY OF THE INVENTION

The principal objects of the present invention are to provide a plant shipping container having the desired characteristics of being able to handle a relatively large quantity of plants without overcrowding of the developed parts of the plant; being able to firmly retain the plant and growing media in place thereby permitting shipment with little or no damage as a result of jarring or jostling of the container during shipment; being highly temperature tolerant owing to its preferred manufacture from polystyrene material and the novel manner in which the various parts of the container are interconnected, and being relatively inexpensive to manufacture and totally reusable.

In accordance with the invention, the shipping container comprises two or more frames or trays in which the rooted plants are positioned. The frames are stacked vertically, with the lowermost frame being positioned over a supporting frame, and the uppermost frame receiving a cover member. The peripheral walls of all the frames and the cover are constructed such that these members can be nested together, with a preferable nesting arrangement being provided by forming tongues and grooves at the periphery of each member.

The plant supporting frames comprise a generally open frame, with two or more support members extending either longitudinally or transversely in the frame and being connected to the sides or ends of the frame. Generally S-shaped members are positioned on and extend upwardly from the supports, with the S-shaped members being spaced so that adjacent members define a space within which the rooted plants can be closely positioned. The configuration and spacing of the members is such that a pair of wedge-shaped plants or liners can be positioned between adjacent members, with the plants extending in opposite directions.

In the embodiment shown, two plant-containing frames are used, although it will be understood that the entire system is essentially modular, and a single plant frame or more than two could be employed with equal facility. A major advantage of this system is that the support members in each plant-containing frame are generally co-planer with the bottom of the frame walls whereby the bottom surfaces of the supports when the frames are nestled in superimposed relation are closely adjacent the upper surfaces of the S-shaped members of the frame below. In this manner, adjacent S-shaped members, the support member on which they are mounted, and the overlying surface of the support member above form a compartment receiving with limited clearance the plants or liners. The compartments are open at their respective sides to permit the main stem of the plants to extend horizontally from the members into the areas adjacent the members and the underlying support.

All of the system components, mainly, the supporting frame, the plant-containing frame, and the cover are preferably formed of polystyrene, with the construction of the components lending themselves to inexpensive molding techniques and consequently reduced manufacturing costs. However, other suitable plastics material can be used, or the container could be made of non-plastics material. The plant-containing frames when formed of plastics material are preferably integrally molded so that the supports are integral with the frame wall and the S-shaped members are integrally molded with the support members.

A further advantage of the invention is the provision of areas in which temperature control means and appropriate marking tags can be located. In the form shown, the bottom supporting tray contains a bottom wall spaced from the bottom surface of the supports of the overlying plant-containing frame thereby providing a space within which temperature controlling means can be placed. For example, in summer situations of high heat and humidity, dry ice could be located in the compartment or chamber defined by the bottom wall of the supporting tray, and during periods of extreme cold, insulating material could be positioned in such space to provide extra protection for the plants. In addition, a compartment can be defined in the bottom supporting tray in which marking tags or labels can be placed so that they are conveniently available for placement with the plant material when transplanted. The tongue and groove interconnection of the various parts permits the cover and bottom supporting frame to be transposed, that is, the cover could serve as the bottom supporting member and what is shown in the application drawings as the bottom supporting frame could be inverted and utilized as the cover.

The container also affords flexibility in the types of plants being shipped. The dimensions of the frame members can be varied as desired, and the support members can extend longitudinally or transversely. Further, the spacing of the support members from each other and from the laterally adjacent frame walls can take into account the amount of growth of the plants so that such growth is not damaged during packing and shipment.

These and other objects of the invention will be apparent as the following description proceeds in particular reference to the application drawings.

BRIEF DESCRIPTION OF THE APPLICATION DRAWINGS

FIG. 3 is a perspective top view, partially fragmentary, showing a plant-containing tray having the supports mounted therein and the S-shaped members mounted on the supports, and FIG. 4 is an enlarged sectional view through interconnected side walls of the supporting frame, the plant-containing frames, and the cover.

DETAILED DESCRIPTION OF THE PREFERRED EMBODIMENTS

Figure 1:
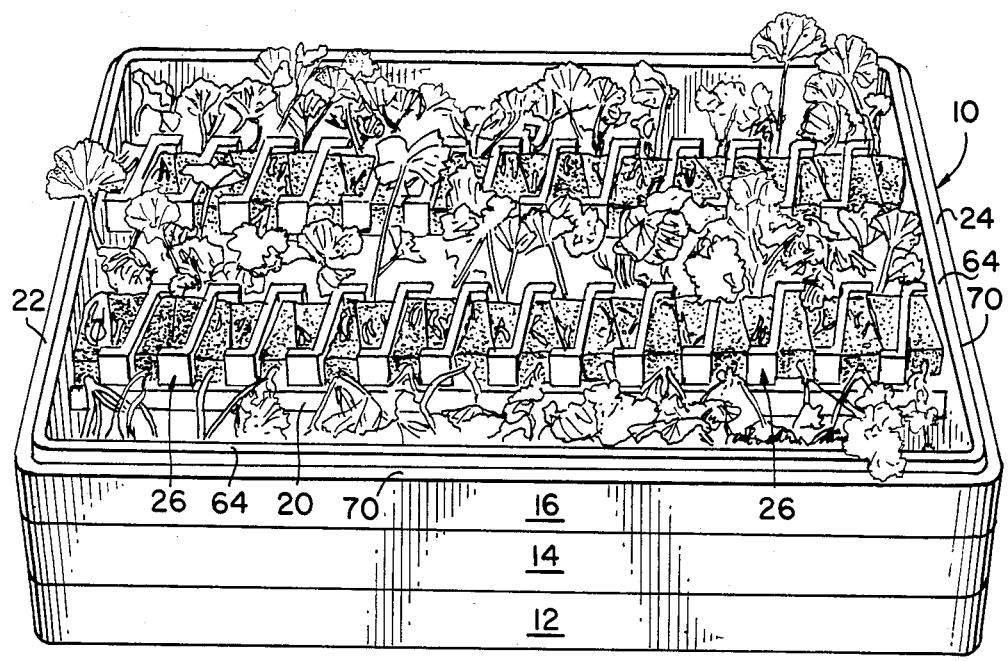
FIG. 1 is a top perspective view, partially broken, of the invention, with the plant-containing frame shown at the top having plants or liners positioned between adjacent S-shaped members, with the stems and leaves of the young plants extending to either side of the S-shaped members. A cover for the frames does not appear in FIG. 1.

Referring to FIG. 1, the shipping container or system of the present invention is generally indicated at 10, and comprises a bottom supporting frame 12, a first or lower plant-containing frame 14, and an upper plant-containing frame 16. It will be understood, and will be apparent from FIG. 4, that when the container is readied for shipment, a cover member 18 will be disposed above the top frame 16 and interconnected thereto.

Figure 2:
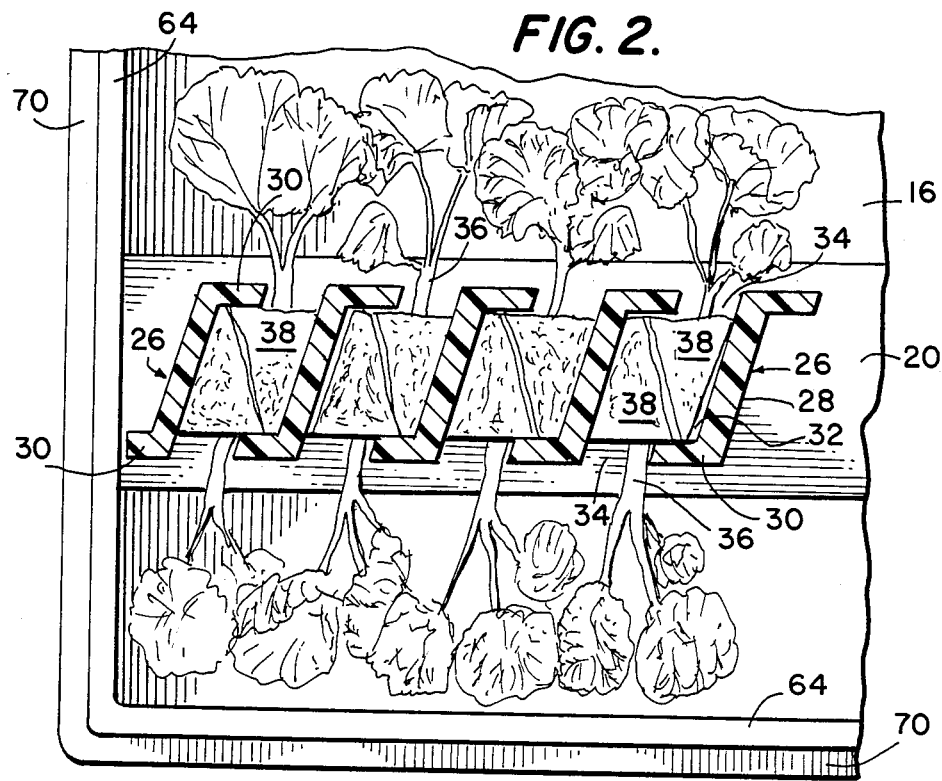
FIG. 2 is a greatly enlarged and fragmentary top plan view, showing in more detail the shape of the S-shaped members and the manner in which the rooted plants are positioned therebetween with the plant stems and leaves protruding outwardly on either side thereof.

FIG. 1 illustrates only the upper frame 16 as containing plants, although it is understood that frame 14 is filled in a similar manner. The upper frame 16 has a pair of longitudinal support members commonly designated at 20, only one of which is shown in FIGS. 1 and 2, connected, preferably integrally, to the end walls 22 and 24 of the frame 16, with a plurality of S-shaped members commonly designated at 26 being preferably integrally formed with the support 20 and extending upwardly therefrom in spaced relation. Each S-shaped member 26 includes an elongated central web 28 and legs commonly designated at 30 extending in opposite directions from the central web. Adjacently disposed S-shaped members as shown in FIG. 2 define an opening 32 generally parallelogram-shaped, being closed except for openings 34 at each side through which the plant stems can extend.

In FIG. 2, positioned in each area or compartment 32 are a pair of rooted plants commonly designated at 38. The roots and growing media are in the shape of wedges which are generally triangular in cross section, and when positioned together as shown in FIG. 2 are generally rectangular in cross section and fit reasonably tightly into the area 32. The wedges are bounded by the support 20 on the bottom, the S-shaped members 26 on their sides and ends (except for openings for the plant stems), and by the bottom surface of the cover or the bottom surface of a support member in the event a plant frame is positioned thereover. The reasonably tight confinement of the wedges makes the same relatively impervious to the normal bumps and jarring which shipping containers are subjected to during shipment.

Referring to FIG. 3, a plant frame, for example, frame 16, is illustrated. In addition to the end walls 24 and 22 previously described, the frame includes end walls 23 and 25, with the walls together defining an open area.

The support members 20 in the form shown extend between the end walls 22 and 24, with the bottom surfaces of the supports preferably being co-planer with the bottoms of the wall members comprising the frame. However, it will be understood that the support members could extend in a transverse direction between the walls 23 and 25. This may be desirable when the rigidity of the members in a longitudinal direction is decreased under loading. It will also be understood that the length and width of the frames can vary, and that the support members can vary in size and number depending on the plants being shipped.

The height of the members 26 is such that the members extend fairly close to the top surface of the frame walls. Thus, when plant frames are superimposed one above the other, the bottom surface of the supports 20 will be positioned closely adjacent the top surfaces of the S-shaped members 26, thereby serving to essentially close each area or compartment 32 as previously described.

The nesting of the several frame members and cover is preferably and most easily accomplished by tongue and groove formations located on the top and bottom surface of the frame walls. Referring to FIG. 4, the supporting frame 12 is formed with a tongue 50 which extends entirely around the frame 12, and a groove 52 disposed outwardly of the tongue 50 and recessed relative thereto. Similarly, the plant frame 14 is formed with tongues 54 and 56 at the bottom and top thereof, respectively, and grooves 58 and 60. The top frame 16 in the embodiment shown includes a bottom tongue 62 which fits into the groove 60, and a top interior tongue 64. The cover 66 includes an outer tongue 68 which engages groove 70 when the cover 66 is placed in position to close the container. In this manner each successive frame tightly engages the frame therebelow, with the cover also firmly engaging the top frame 16. This nesting arrangement, together with the plastics material from which the various components are preferably made, polystyrene, provides a container which is resistant to temperature excesses in either extreme.

In order to more precisely stabilize the temperature within the container, it will be noted that a space 80 is provided in the bottom supporting frame 12 above the bottom wall 82. This space closely approximates in volume the space within the frame walls of the frames 14 and 16, excluding the space occupied by supports 20 and the S-shaped members 26. Means can be disposed in the space 80 for temperature control. For example, during periods of excessive heat, containers of dry ice or similar refrigerant can be placed in the space 80. In periods of cold weather, additional insulation can be placed in the area 80. In either situation, the area is also preferably provided with a pocket or compartment in which plant labels and perhaps growing instructions can be placed. This makes it very convenient for the user to place a plant tag or label with each plant as the same is transplanted into a larger container, as would normally be the case.

Although the cover 66 in the form shown is relatively shallow, and the supporting base 12 relatively deep, it will be understood that these members can be transposed. The cover 66 could comprise the base, and the frame member 12 the cover. In such event, any temperature control means would be located just beneath the cover, as opposed to the bottom area 80 as shown in FIG. 4.

The manner in which the shipping container comprising the invention is used should be apparent from the above description. A plant frame as shown in FIG. 3 is filled with rooted plants or liners in the manner described. The space between adjacent S-shaped members is almost fully occupied by the liners, with the plant stems extending outwardly or horizontally through the openings 34, in opposite directions from each area or compartment. When the frame has been completely filled with plantlets, as illustrated in FIG. 1, the frame is positioned on the support frame 12 in nested position by virtue of the tongue and groove arrangement shown in FIG. 4. A second frame is then filled, and positioned on the first frame, similarly with the tongue and groove locking arrangement. If only two plant frames are used, the cover 66 is then positioned over the top frame 16 and the container is ready for shipment. Normally, straps, banding, twine or the like is wrapped around the container when fully assembled to make certain that the components do not become dislodged. Before the lowermost plant frame is positioned, suitable temperature control materials can be placed in the open space 80 provided by the supporting frame 12. If the frame 12 and cover 66 are transposed as described above, the temperature control material is placed in the frame 12, which then serves as a cover, prior to positioning the same over the uppermost plant frame.

The advantages of the present invention will be readily apparent. By positioning the wedge-shaped plantlets snugly between the S-shaped members, maximum utilization of space is afforded. Since the plant stems and immature leaf growth extend horizontally from the areas or compartments defined by the S-shaped members, the vertical dimension of the plant frame can be considerably reduced when compared with known shipping containers in which the plants are arranged vertically. Each plant frame when filled with plantlets can be quickly positioned either on the bottom supporting frame or on a plant frame previously positioned on the supporting frame.

The open nature of the plant frames permit air circulation through the frame during the filling operation, and also permits air within the closed container to circulate freely throughout the container. This prevents stagnancy and ensures continued growth of the plants during shipment. By locating the support members in the plant frame so that the bottom surfaces of the supports are closely adjacent the top surfaces of the S-shaped members of the frame therebelow, a relatively closed compartment is provided for each pair of plantlets thereby greatly inhibiting the disintegration or breaking apart of the growing media during shipment. When the shipping container arrives at its destination, the plantlets can be quickly and easily removed and transferred to larger containers for further growth.

All of the described components of the shipping container are preferably made of polystyrene, sufficiently rigid to avoid breakage during use, and to permit continued reuse of the frames and cover. All components of each plant frame (the open frame walls, the supports, and the S-shaped members) are preferably integrally molded, although other forms of securing the supports to the frame and the S-shaped members to the supports could be utilized if the requisite characteristics are met. Although two support members 20 are illustrated, it will be understood that one or more than two could be used, depending on the plant material being shipped and the shape and dimensions of the frames, which also can vary as desired.

It will be apparent to those skilled in the art that departures can be made from the foregoing description and drawings without, however, departing from the spirit of the invention. For example, plant enclosing members of other configurations than the S-shaped members shown could be utilized. Thus, T-shaped members, with every other member inverted, could be provided to form a generally rectangular area or compartment for receiving the plantlets. The members would of course be spaced on the supports to accommodate the size of the plantlets being shipped and to provide side openings through which the plant stems can extend. The concept of positioning the plantlets completely within an essentially closed compartment would remain realized.

In addition, materials other than polystyrene could be employed, for example, other types of plastics material meeting the necessary requirements of use as described above. The nesting of the frames could also be accomplished in a slightly different manner. For example, rather than having the upwardly extending tongue formed on the inside of the frame wall, it could be positioned on the outside thereof, or a centrally located tongue could be provided in the top wall of each frame, and a centrally located groove formed in the bottom wall of each frame. Again, the concept is to provide a relatively tight fit between the superimposed frame members.

What is claimed is:

1. A shipping container for shipping plants or the like, comprising:
   (a) a bottom supporting frame having side and end walls;
   (b) at least one plant frame comprised of side and end walls, support means extending between either said side walls and spaced from said end walls, or extending between said end walls and spaced from said side walls, and a plurality of spaced upright members mounted on and extending upwardly from said support means, each pair of adjacent upright members being spaced so as to define with said support means a compartment for receiving one or more rooted plantlets, said members being configured so as to provide in each pair of adjacent members openings at the sides thereof through which a plant stem can extend in a direction generally parallel the plane of said support means;
   (c) cover means positioned over said at least one plant frame, said cover means including side and end walls, and wherein
   (d) said supporting frame, at least one plant frame and said cover are dimensioned so that the side and end walls thereof are in alignment when said frames and cover are assembled, with the walls of each of said frames and said cover being formed with interlocking means so that each superimposed component can be snugly received by the component therebelow thereby to provide a relatively sealed container.

2. The container of claim 1 wherein each adjacent pair of upright members are spaced and configured so as to receive a pair of rooted plantlets, with the stems of each plantlet extending outwardly through said openings in directions away from each other.

3. The container of claim 1 wherein said support means comprises at least two support members extending between and mounted to either the end walls or side walls of said plant frame, the spacing of said members from each other and from the walls which do not mount the support members being such that the stems and leaves of plants positioned within said upright members can extend generally horizontally through said openings defined by said upright members and be accommodated without significant damage caused by either the side walls of the plant frame or the contiguously disposed leaves of laterally positioned rooted plantlets.

4. The container of claim 3 wherein the bottom surfaces of said support members are generally co-planer with the bottoms of said side and end walls of said plant frame, and wherein said upright members extend vertically to a level adjacent the top surfaces of the side and end walls, whereby when two or more plant frames are positioned superimposed one above the other the bottom surface of said support members are positioned closely adjacent the top surfaces of the upright members of the plant frame positioned therebelow thereby to define the upper bounds of the area or compartment in which the rooted plantlets are positioned.

5. The container of claim 1 wherein said upright members are generally S-shaped in cross section, with the legs of the members being of a length such that when a pair of said members are adjacently disposed, side openings are defined through which the stem and plant leaves can extend.

6. The container of claim 1 wherein said interlocking means comprises complimentary tongues and grooves formed on the upper surface of the walls of said supporting frame, the upper and lower surfaces of the walls of said at least one plant container, and on the lower surface of said walls of said cover.

7. The container of claim 6, wherein the upper surfaces of said walls of said supporting frame and said at least one plant frame are formed with inwardly positioned tongues and outwardly positioned grooves, and wherein the bottom surfaces of the wall of said at least one plant container and said cover are formed with outward tongues and inwardly positioned grooves.

8. The container of claim 1 wherein said bottom supporting frame, said at least one plant frame and said cover are formed of plastics material.

9. The container of claim 8 wherein the walls of said plant container, said support means and said upright members are integrally molded in one piece.

10. The container of claim 8 wherein said plastics material comprises polystyrene.

11. The container of claim 1 wherein said bottom supporting frame includes a bottom wall integrally connected to said side and end walls thereby, and wherein said side and end walls of said supporting frame are of a height to define with said bottom wall a usable space in which temperature control means can be positioned for maintaining the temperature of the rooted plantlets during shipping thereof.

* * * * *